United States Patent
Firouzi et al.

(10) Patent No.: US 11,293,791 B2
(45) Date of Patent: Apr. 5, 2022

(54) LEAKY LAMB WAVE FLOWMETER

(71) Applicant: The Board of Trustees of the Leland Stanford Junior University, Stanford, CA (US)

(72) Inventors: Kamyar Firouzi, Palo Alto, CA (US); Butrus T. Khuri-Yakub, Palo Alto, CA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 162 days.

(21) Appl. No.: 16/608,987

(22) PCT Filed: May 3, 2018

(86) PCT No.: PCT/US2018/030992
§ 371 (c)(1),
(2) Date: Oct. 28, 2019

(87) PCT Pub. No.: WO2018/204723
PCT Pub. Date: Nov. 8, 2018

(65) Prior Publication Data
US 2020/0056917 A1 Feb. 20, 2020

Related U.S. Application Data

(60) Provisional application No. 62/501,561, filed on May 4, 2017.

(51) Int. Cl.
*G01F 1/66* (2022.01)
*G01F 1/667* (2022.01)
(Continued)

(52) U.S. Cl.
CPC .......... *G01F 1/667* (2013.01); *G01N 29/024* (2013.01); *G01N 29/46* (2013.01); *G01N 2291/02836* (2013.01); *G01N 2291/0427* (2013.01)

(58) Field of Classification Search
CPC ............. G01N 29/024; G01N 29/46; G01N 2291/02836; G01N 2291/0427; G01F 1/66; G01F 1/662; G01F 1/667
See application file for complete search history.

(56) References Cited

U.S. PATENT DOCUMENTS 4,735,097 A 4/1988 Lynnworth
4,838,127 A 6/1989 Herremans et al.
(Continued)

FOREIGN PATENT DOCUMENTS

WO  WO2011078691  6/2011

OTHER PUBLICATIONS

Rautenberg et al, "Utilizing Leaky Lamb Waves in an Acoustic Waveguide for the Measurement of Liquid Properties", 2013, Sensors 2013, pp. 74-79.

*Primary Examiner* — Benjamin R Schmitt
(74) *Attorney, Agent, or Firm* — Lumen Patent Firm (57) ABSTRACT

Propagation of leaky Lamb waves in pipe walls is used to provide a clamp-on acoustic flow meter for single-phase fluid flow in pipes. The received acoustic signals can be analyzed analytically, or by matching to numerical models, or with machine learning. In a preferred embodiment, variation of penetration depth of the leaky Lamb waves into the fluid flow with frequency provides an approach for measuring flow rate vs. radius with a clamp-on flow meter.

10 Claims, 8 Drawing Sheets

(51) Int. Cl.
*G01N 29/024* (2006.01)
*G01N 29/46* (2006.01)

(56) References Cited

U.S. PATENT DOCUMENTS

| | | |
|---|---|---|
| 6,575,043 B1 | 6/2003 | Huang et al. |
| 2004/0199340 A1 | 10/2004 | Kersey |
| 2006/0020404 A1 | 1/2006 | Kishiro |
| 2008/0163700 A1 | 7/2008 | Huang |
| 2016/0305805 A1* | 10/2016 | Baumoel ................. G01F 1/663 |
| 2016/0327419 A1* | 11/2016 | Hellevang ................. G01F 1/74 |

\* cited by examiner

LEAKY LAMB WAVE FLOWMETER

CROSS-REFERENCE TO RELATED APPLICATIONS

This application is a 371 of PCT application PCT/US2018/030992 filed May 3, 2018. PCT application PCT/US2018/030992 claims the benefit of U.S. Provisional application 62/501,561 filed May 4, 2017.

FIELD OF THE INVENTION

This invention relates to measuring properties of fluid flow in pipes, such as flow rate.

BACKGROUND

An ultrasonic flowmeter is a type of flowmeter that measures the velocity of a fluid with ultrasound to calculate volume flow. Ultrasonic flowmeters are widely applied to measure flow in a variety of applications. Ultrasonic flowmeters use acoustic waves or vibrations to detect the flow traveling through a pipe. Ultrasonic energy is typically coupled to the fluid in the pipe using transducers that may be wetted (aka invasive) or non-wetted (aka non-invasive), depending upon the design of the flowmeter. This can either be done in-line, by inserting a spool piece with ultrasonic transducers into the pipe carrying the fluid, or by clamping the transducers on an existing pipe. Using ultrasonic transducers, the flowmeter can measure the average velocity along the path of an emitted beam of ultrasound by various methods.

Clamp-on meters are attractive as they can be installed without cutting the pipe or shutting down the flow, but their stability is limited, and they are unable to measure flow profiles (in contrast with expensive multi-path in-line meters), which limits their linearity at low flow speeds. Moreover, their installation typically requires complex manual alignment of the transducers and input of a variety of setup parameters (e.g., pipe dimensions and material properties, speed of sound in the fluid) by the user.

Figure 1:
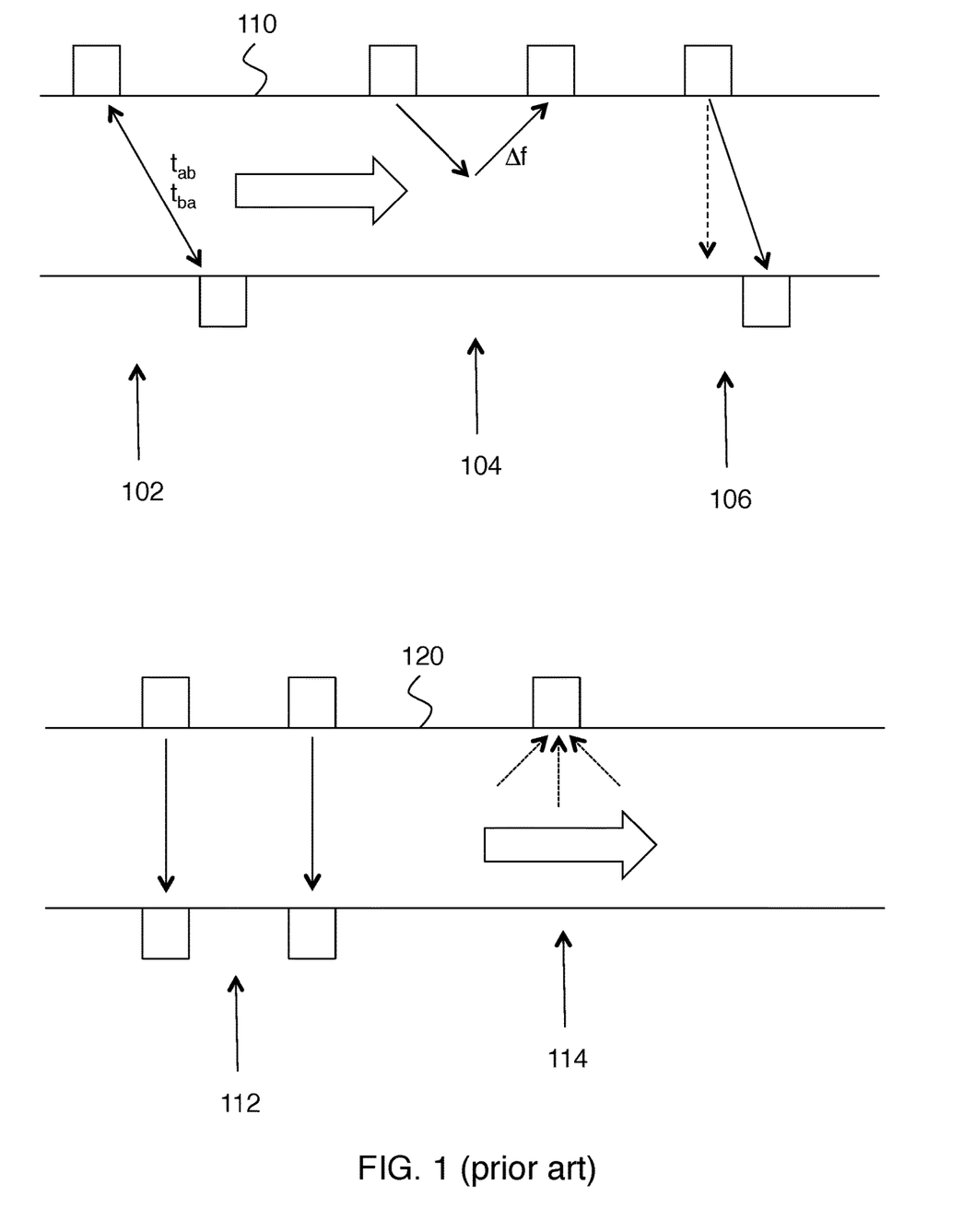
FIG. 1 schematically shows several conventional techniques for noninvasive ultrasonic flow metering.

There are several different ways by which ultrasonic signals can be utilized to calculate flow rate for clamp-on meters. FIG. 1 schematically shows five different non-invasive methods that can be used to measure flow in pipes 110 and 120: transit time 102, Doppler 104, beam deflection 106, cross correlation 112 and passive acoustics 114.

The three main types of non-invasive ultrasonic technology currently used are Transit-Time, Doppler, and Cross-Correlation, which are explained in detail below. Passive Acoustics (e.g., 114 on FIG. 1) is a technique where the transducer simply 'listens' to the naturally occurring vortices or eddies in the flow. By monitoring how fast they flow by the transducer, a velocity can be derived. Beam Deflection (e.g., 106 on FIG. 1) works by transmitting an ultrasonic beam across the pipe which is slightly deflected by the flow. This deflection is monitored and is directly related to the velocity of the flowing medium.

Figure 2A:
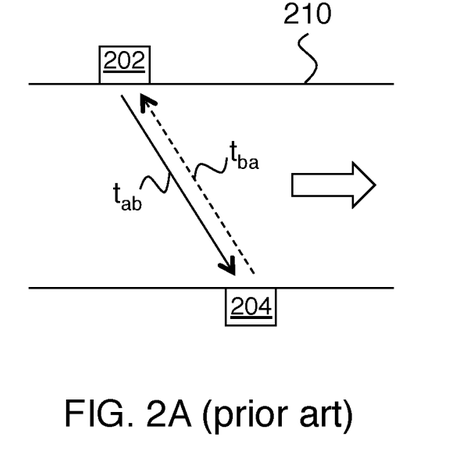
FIGS. 2A-B show transit time noninvasive ultrasonic flow metering.
Figure 2B:
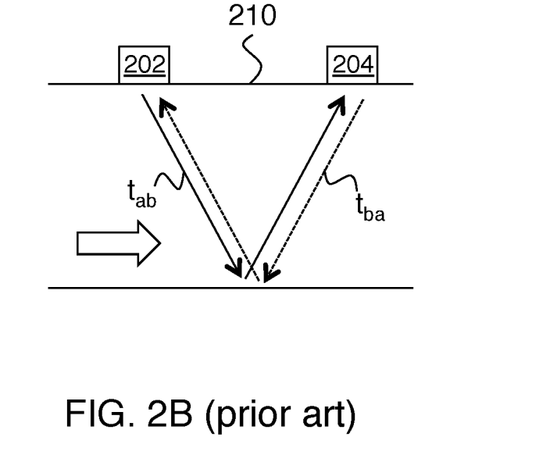

Transit-Time (e.g., 102 on FIG. 1 and FIGS. 2A-B) is the most common type of clamp on technology and can be used for both gases and liquids. The principle is based on the time difference it takes for an ultrasonic pulse to travel a defined distance both with and against flow. The difference is directly related to the velocity of the flow and is to some extent analogous to a boat crossing a river. If the boat is travelling with the current then it will be helped across to some degree by the flowing fluid but the opposite is true when travelling against the current. FIG. 2A is normally referred to as direct mode, i.e., the ultrasonic beam only makes one traverse across pipe 210. FIG. 2B is normally referred to as reflect mode as two traverses across pipe 210 are required. As shown in FIG. 2A, transducer 202 transmits an ultrasonic pulse across a pipeline which is received by transducer 204, or vice versa. Since the sound velocity for the flowing medium and the length the ultrasound travels are both known, a simple equation can be used to calculate the time taken for the ultrasonic signal to reach the receiving transducer. This is also known as the time-of-flight of the ultrasonic signal. Similarly, FIG. 2B shows transmission of sound from transducer 202 to transducer 204 (or vice versa) via reflection from the opposite pipe wall.

Figure 3:
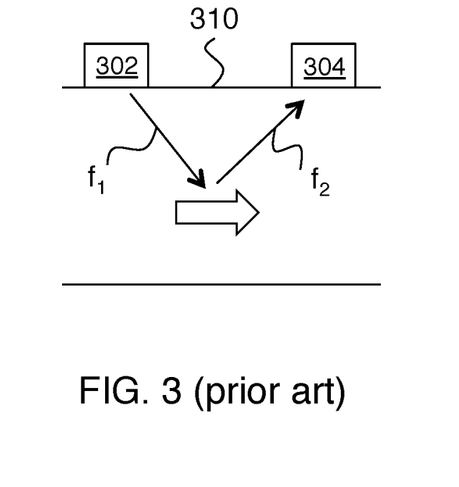
FIG. 3 shows Doppler noninvasive ultrasonic flow metering.

Doppler non-invasive ultrasonic flowmeters (e.g., 104 on FIG. 1 and FIG. 3) are based on the well-known Doppler principle and frequency shifts in the ultrasonic signal. In flow measurement, again two transducers are used and are often placed on the same side of the pipe. Most Doppler techniques require a small amount of gas or entrained solids in the flow in order to calculate a velocity. As shown on FIG. 3, transducer 302 emits an ultrasonic beam of a known frequency $f_1$. This beam reflects off either the gas bubbles or solids within the flow in pipe 310 and is thereby frequency shifted to frequency $f_2$. Transducer 304 then receives the frequency shifted ultrasonic signal and by measuring the frequency change the flow velocity can be derived.

Figure 4:
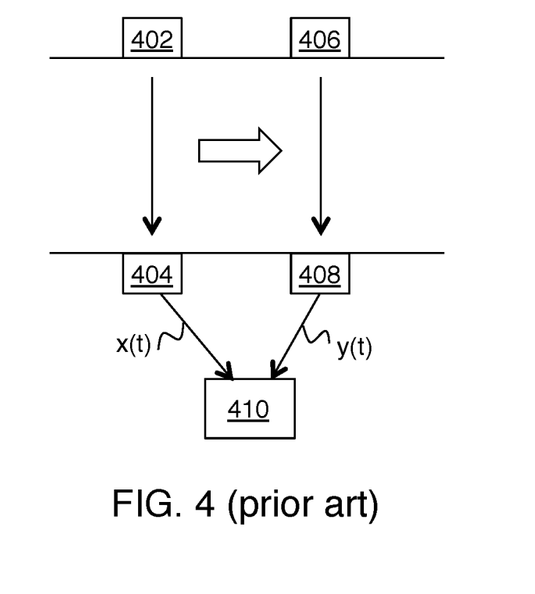
FIG. 4 shows cross-correlation noninvasive ultrasonic flow metering.

In the Cross-Correlation technique (e.g., 112 on FIG. 1 and FIG. 4), two pairs of transducers 402, 404 and 406, 408 are positioned on a pipe with both receivers (404 and 408) and both transmitters (402 and 406) on the same side of the pipe respectively. The transducer pairs are placed in the same plane in order to maximize the potential for correlating signals. The main difference between transit-time and cross-correlation flowmeters is that one transducer is always the transmitter and one transducer is always the receiver; they do not swap roles. FIG. 4 shows the transducer configurations: Both the upstream and downstream transducers transmit an ultrasonic pulse across the pipe that is modulated by naturally occurring eddies or vortices in the flow. The result is two very similar waveforms x (t) and y (t) that have distinctive peaks which are displaced by a time factor. This time factor is directly proportional to the distance between the pairs of transducers and inversely proportional to the flow velocity. To calculate the time difference a mathematical cross-correlation function is used, schematically shown by 410 on FIG. 4.

SUMMARY

We provide a novel clamp-on ultrasonic flow metering technique capable of measuring the flow rate and other parameters of a pipeline by selectively exciting and receiving Lamb waves in the pipe. Lamb waves, in contact with a fluid, can leak at a different rates. Furthermore, the moving fluid alters the leak rate as a function of the flow velocity. At low frequencies, the wavelength is larger, thus the penetration depth in the flow is larger. As the frequency increases, the penetration depth becomes smaller. The penetration depth provides a methodology to sample the flow velocity profile. FIGS. 8A-D schematically show this flow metering concept. By selectively exciting and receiving guided waves in the pipe, the information of frequency/mode-dependent leak rates are recorded. The leak rate is a function of the frequency, moving fluid in the pipe, its velocity, and its direction. The flow rates can be estimated through analytical, computer based, or machine learning algorithms.

The transducers preferably provide a broad-band selective excitation of the guided axisymmetric Lamb modes. The system can include a transmitter transducer and a receiver transducer. In one mode of operation, we looked into the difference in the arrival time of the transmitted guided waves once it reaches the receiver. In another mode of operation, we look at the amplitude of the transmitted wave, which in turn provides a measure of the leak rate. Note that by switching the transmitter and receiver, we can look at the same feature in the reverse direction, in both of these cases. In turn, by doing so, we can reduce measurement error and increase accuracy. Moreover, the above mentioned methods can be combined to improve the accuracy even more. In a third mode of operation, we use both transducers in the transmit and receive modes, in which we set up standing waves in between the transducers. The modes of the standing waves are modulated by the flow through frequency-dependent leak rates. The transducers can be connected to an electrical instrument such as a network analyzer, spectrum analyzer, impedance analyzer, time-domain pulser/receiver, etc., by which means the response of the guided waves of the pipe is monitored and recorded as a function of flow velocity.

Numerous applications are possible. Clamp-on meters are applied, for instance, in the oil-and-gas, chemical, food, and semiconductor industries. They are capable of measuring gas or liquid flow without introducing contamination, leakage, fouling, pressure drops or energy losses. They are found both in permanent installations, e.g. where hygiene, continuous operation, maintenance and cost are a major consideration, as well as in temporary use, as a tool for checking, servicing and maintaining existing flowmeters.

Significant advantages are provided. This approach provides a non-invasive flow rate measurement, without the need to cut through and insert a sensor into the pipe. Since this is a clamp-on technique, it can be used as a temporary, semi-permanent or permanent method of measurement. It can be used to measure other flow characteristics such as pressure, temperature, composition, bubble content, velocity profile, etc. It can measure both gas and liquid flows. Our method can bring clamp-on sensors closer to in-line (i.e., wetted/invasive) sensors in terms of performance and applicability. It can greatly simplify the installation procedure and enhance safety. It can improve the accuracy and repeatability in the presence of changes in temperature, density, and composition, reducing maintenance needs. Moreover, the unique capability to measure the velocity profile is unavailable in current clamp-on meters. It also provides better sensitivity to the flow velocity with a wide dynamic range (i.e., can be used to measure very slow flow to very fast flow speeds). It can enable the accurate measurement of both laminar and turbulent flows, thus enhancing the linearity across a wide range of flow speeds. These improvements are expected to expand the application space of clamp-on flowmeters and thus offer an important competitive advantage to existing technologies. The availability of high-performance clamp-on sensors will also be a competitive advantage to end-users, e.g. in the oil-and-gas, and chemical industries.

DETAILED DESCRIPTION

Figure 5:
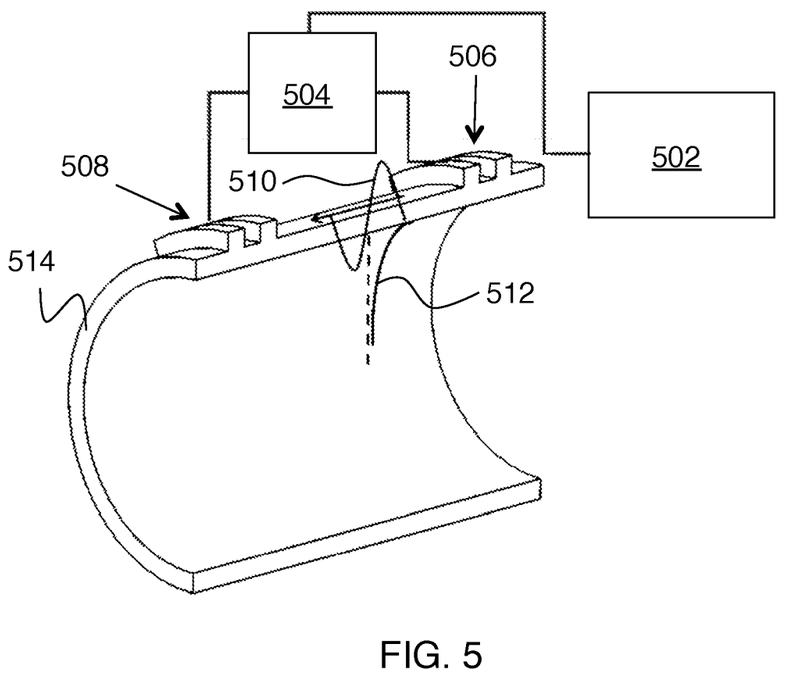
FIG. 5 shows operation of an embodiment of the invention.

FIG. 5 shows operation of an embodiment of the invention. In this example, a Lamb wave 510 is launched by transducer 506 and received by transducer 508. Transducers 506 and 508 are connected to electronics unit 504 which in turn is connected to a processor 502. The sensitivity of Lamb wave 510 to fluid flow in pipe 514 is schematically shown as penetration depth 512.

This provides a ultrasonic flow metering technique capable of measuring the flow rate and other parameters of a pipeline by selectively exciting and receiving Lamb waves in the pipe wall. Lamb waves in the pipe wall adjacent to a fluid medium (such as liquid or gas) can leak. The leak rate is approximately a few wavelengths. Moreover, when the there is a flow through the pipe, the leak rate changes as a function of the flow speed, flow direction and acoustic frequency. By monitoring the modulation of the modal characteristics of the pipe, such as the leak rate and/or time-of-flight, in response different flow rates, we can estimate the corresponding flow rates. Fluid parameters other then flow rate—such as pressure, temperature, composition, and bubble content—may also be determined according to these principles.

Practice of the invention does not depend critically on details of electronics unit 504 and processor 502, or on how components are partitioned between these two units. The transducers can be connected to an electrical instrument such as a network analyzer, spectrum analyzer, impedance analyzer, time-domain pulser/receiver, etc., by which means the response of the guided waves of the pipe is monitored and recorded as a function of flow velocity.

An exemplary embodiment of the invention is a method for measuring fluid flow rate in a pipe including the following steps:

1) providing a pipe having a single-phase fluid flow within it. Here the fluid flow can be a gas flow or a liquid flow;

2) disposing at least two axially separated acoustic transducers on an outside surface of the pipe;

3) exciting one or more leaky Lamb waves in a wall of the pipe with one or more of the acoustic transducers. Here each leaky Lamb wave has a corresponding leak rate of energy loss to the single-phase fluid flow and the leak rates of the Lamb waves depend on flow parameters of the fluid within the pipe;

4) receiving the one or more leaky Lamb waves with one or more of the acoustic transducers to provide received acoustic signals;

5) measuring the leak rates of the leaky Lamb waves from the received acoustic signals; and 6) determining at least a fluid flow rate in the pipe by collective analysis of the measured leak rates.

Practice of the invention does not depend critically on the transducers employed. Suitable transducers include, but are not limited to: piezoelectric transducers, electromagnetic acoustic transducers, capacitive micromachined ultrasonic transducers, and piezoelectric micromachined ultrasonic transducers. The transducers can include one or several ultrasonic transducer elements arranged circumferentially or axially over the outer surface of the pipe wall. Materials and dimensions determine the bandwidth and sensitivity of the transducer. Among the feasible transducer geometries are wedge transducers and interdigital transducers or comb transducers. The transducers are preferably designed to achieve a broad-band selective excitation of the guided Lamb modes, which in turn are modulated through different flow rates.

The flow rates can be estimated through analytical, computer based, or machine learning algorithms. In cases where the collective analysis is performed using machine learning, the machine learning algorithm can be trained on a set of reference data relating acoustic signals to flow rate. Alternatively, the collective analysis can be performed analytically or with a computer implemented numerical model.

The above described leak rate measurements can be supplemented with phase change measurements of the leaky Lamb waves. In this case, the collective analysis includes determining flow rate from both the measured leak rates and the phase change measurements.

The system can include a transmitter transducer and a receiver transducer. In one mode of operation, we looked into the difference in the arrival time of the transmitted guided waves once it reaches the receiver. In another mode of operation, we look at the amplitude of the transmitted wave, which in turn provides a measure of the leak rate. Note that by switching the transmitter and receiver, we can look at the same feature in the reverse direction, in both of these cases. In turn, by doing so, we can reduce measurement error and increase accuracy. Moreover, the above mentioned methods can be combined to improve the accuracy even more. In a third mode of operation, we use both transducers in the transmit and receive modes, in which we set up standing waves in between the transducers. The modes of the standing waves are modulated by the flow through frequency-dependent leak rates.

A selected two or more of the axially separated acoustic transducers can operate as both transmitters and receivers during data collection, whereby bi-directional leak rate data is provided. Such transducers can operate as both transmitters and receivers simultaneously, to generate standing waves in the wall of the pipe between the transducers.

Figure 6:
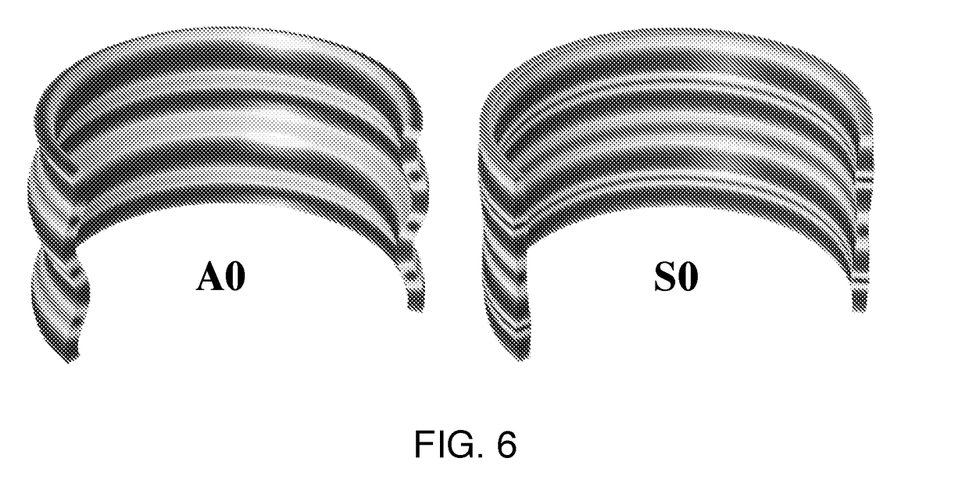
FIG. 6 shows modeled displacement for some exemplary Lamb waves in a pipe.

Aspects of the invention can be better appreciated by considering further details of acoustic wave propagation in pipe walls. Waves propagating in a thin-wall and infinitely long pipe are generally guided waves whose amplitudes are modulated by the circumferential vibrational modes of the pipe. These waves include axisymmetric and non-axisymmetric (circumferential) modes. They can propagate without significant attenuation and can leak into the surrounding medium efficiently. These modes are frequency-dependent and thus dispersive (i.e., they propagate at different speeds at different frequencies). Examples of two different axisymmetric Lamb modes of a pipe are shown in FIG. 6. Guided waves couple the displacement of the outer and inner surfaces of the pipe wall, unlike the surface waves or bulk waves. Consequently, one can efficiently transmit and receive energy from one side (outside the pipe) to the other side (inside the pipe). This provides a suitable means to measure the flow velocity, its profile, and possibly other important parameters such as pressure, temperature, composition/phases, etc.

Figure 7A:
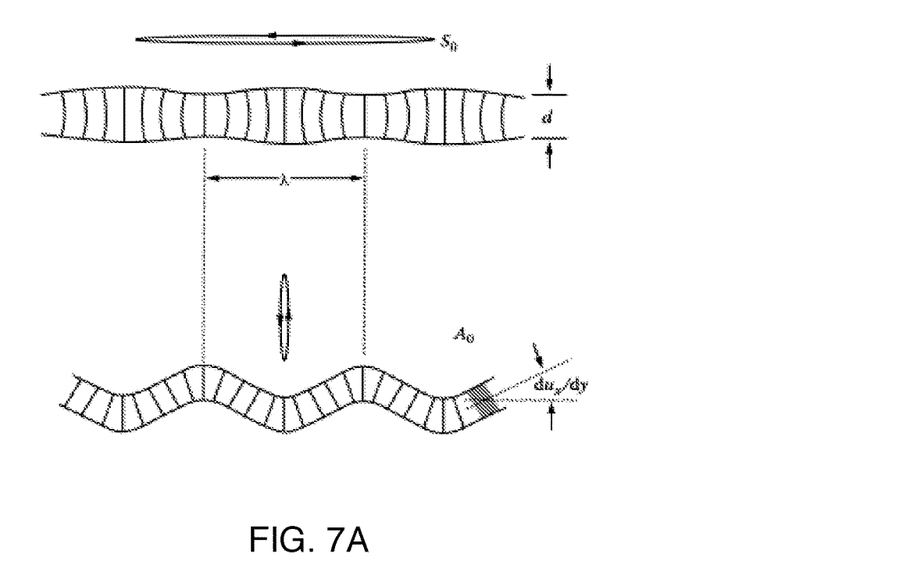
FIG. 7A shows displacement profiles for some exemplary Lamb wave modes.
Figure 7B:
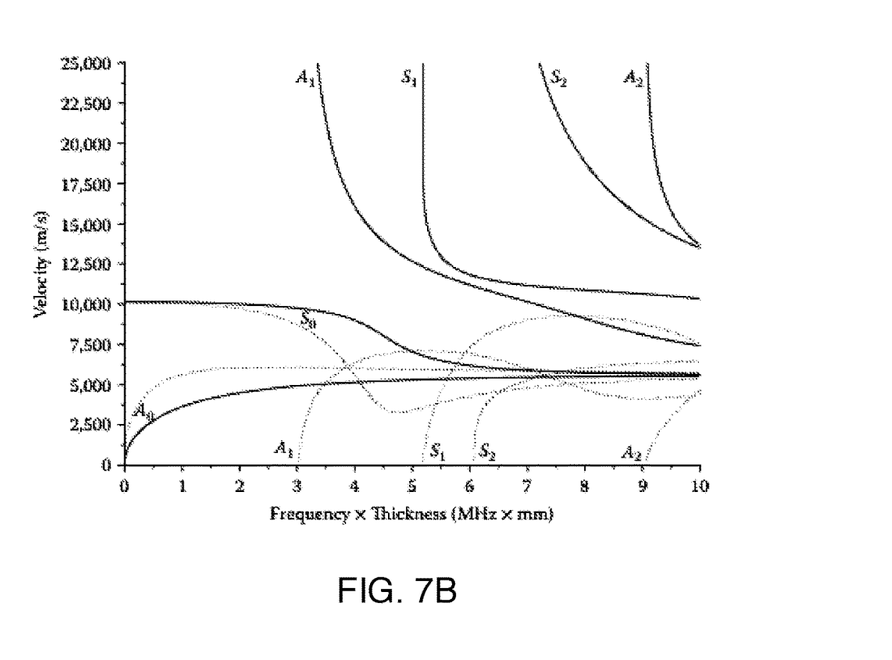
FIG. 7B shows exemplary dispersion curves for several Lamb wave modes.
Figure 8A:
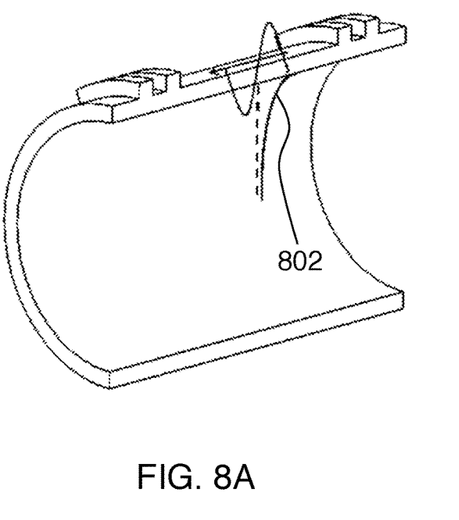
FIGS. 8A-D show different Lamb waves having different penetration depth into the pipe.
Figure 8B:
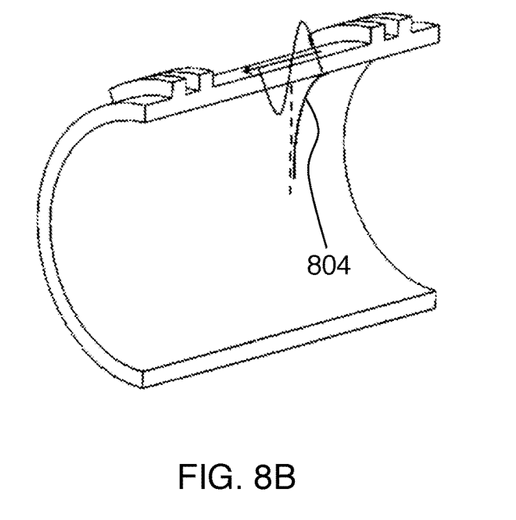
Figure 8C:
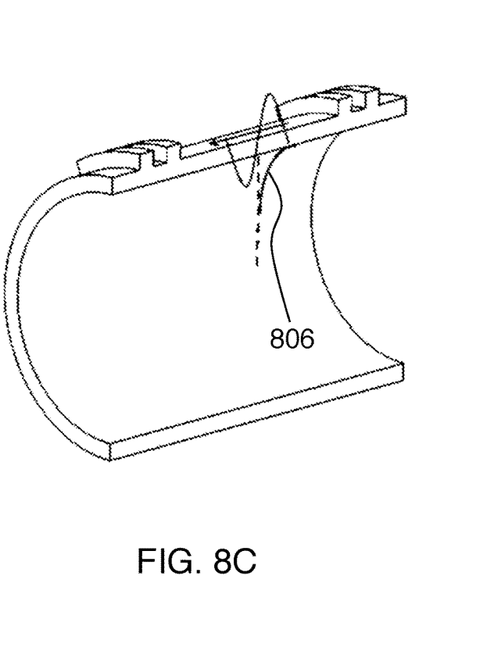
Figure 8D:
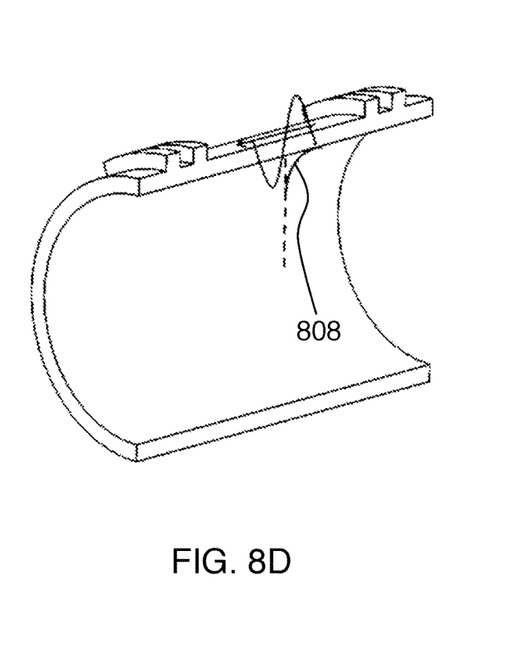

Lamb waves are the guided waves employed in practicing the invention, so further details on Lamb waves are appropriate. FIG. 7A shows displacement profiles for some exemplary Lamb wave modes. FIG. 7B shows exemplary dispersion curves for several Lamb wave modes. Rayleigh-Lamb waves (or in short Lamb waves) are guided elastic waves that propagate in bounded elastic media. For thin structures such as plates or pipe walls with free boundaries, the compressional and shear waves do not exist independently, but are coupled. As the waves propagate, both longitudinal and shear waves repeatedly bounce off the upper and lower boundaries, at which they mode-convert into one another. The superposition of these waves leads to a certain class of guided waves called Lamb waves.

Lamb waves are multi-modal and dispersive, and have a very complicated nature. They are understood and represented in a plane-strain longitudinal shear-vertical (P-SV) setting in two dimensions. Dispersion results in several orthogonal modes. They are classified based on the symmetry of the mode-shapes into symmetric (S) and asymmetric (A) modes. An example of Lamb wave dispersion curves is shown in FIG. 7B, where the phase and group velocities are plotted as functions of frequency with solid lines and dotted lines respectively. The lowest order symmetric and asymmetric modes are generally abbreviated as, respectively, the S0 and A0 modes. The associated modal displacements are shown in FIG. 7A.

Lamb waves have unique properties that make them ideal for applications such as nondestructive monitoring of solid substrates or monitoring flow velocity in pipe. Among these properties, the most useful one is the fact that they exist in the entire frequency spectrum, whereas higher order modes have certain frequency cutoffs, below which they cannot exist. This can be seen in FIG. 7B, where the S0 and A0 Lamb modes have no cutoff frequency. This makes them ideal when the application is limited to a bandwidth below the cutoff frequencies of the higher order modes, as there would be no mode conversion into other modes. This in turn reduces the complications arising from the significant dispersion related effects that occur upon utilizing higher order modes.

Furthermore, the dispersive behaviors of these modes are well-tolerable compared to the higher order ones; in particular, in low frequencies, the S0 mode is almost non-dispersive and the A0 mode very well matches the behavior that is predictable using simple reduced order models such as the classical plate or shell theories. Also, as one goes lower in frequency, the phase velocities of the S0 and A0 modes separate more; hence, the wave-packets generally can be separated and analyzed more easily and accurately. In many practical applications, it is favorable to selectively excite the Lamb modes. This can, however, be very challenging, and in this regard, upon isolating the frequency band, the A0 and S0 modes can be robustly and selectively excited using a proper transducer design (i.e., one that is phase matched to the desired Lamb wave). Lamb waves propagating adjacent to a fluid can leak depending on the velocity of propagation relative to the surrounding medium. These waves are called leaky Lamb waves (also called generalized Lamb waves).

FIGS. 8A-D show different Lamb waves having different penetration depth into the pipe. At low frequencies, the wavelength is larger, thus the penetration depth in the flow is larger. As the frequency increases, the penetration depth becomes smaller. The variation in penetration depth provides a methodology to sample the flow velocity profile. FIGS. 8A-D schematically shows this flow metering concept, where frequency increases from FIG. 8A to FIG. 8D leading to a systematic reduction of penetration depth as shown by 802, 804, 806, 808. Thus two or more leaky Lamb waves having different penetration depths into the single-phase fluid flow can allow determination of a fluid flow rate profile vs. radius.

In an exemplary experiment, a prototype of a Leaky Lamb Wave flowmeter was constructed. Two two-finger interdigital cylindrically-shaped piezoelectric transducers were bonded to the wall of a steel pipe. The contact point between the piezoelectric element and the pipe provides the electric ground connection and the opposite face of the element provides the signal electrode. The transmitting element was then electrically connected to a function generator, by which means the guided Lamb waves of the pipe were excited and monitored on an oscilloscope at the receiver transducer. Here the transmitter and receiver were located several wavelengths apart. Acoustic signals were measured while different flow rates were passing through the pipe for both air and water.

Figure 9A:
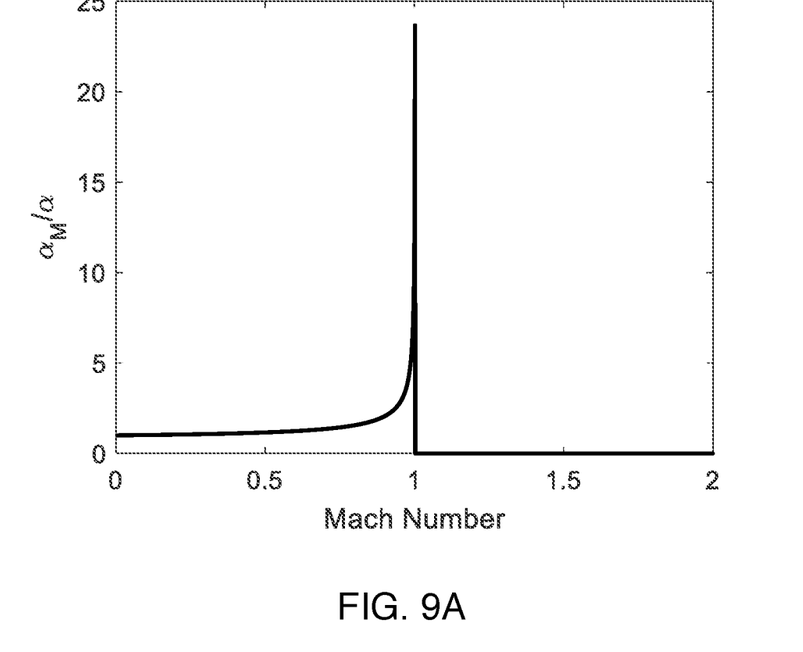
FIG. 9A shows change in the leak rate as a function of Mach number in air for a flow in the direction of the propagating guided waves.

FIG. 9A shows change in the leak rate as a function of Mach number in air for a flow in the direction of the propagating guided waves. Here Mach number is defined as the ratio of the flow speed to the speed of sound, and the results are reported as a ratio with respect to the leak rate in static fluid.

Figure 9B:
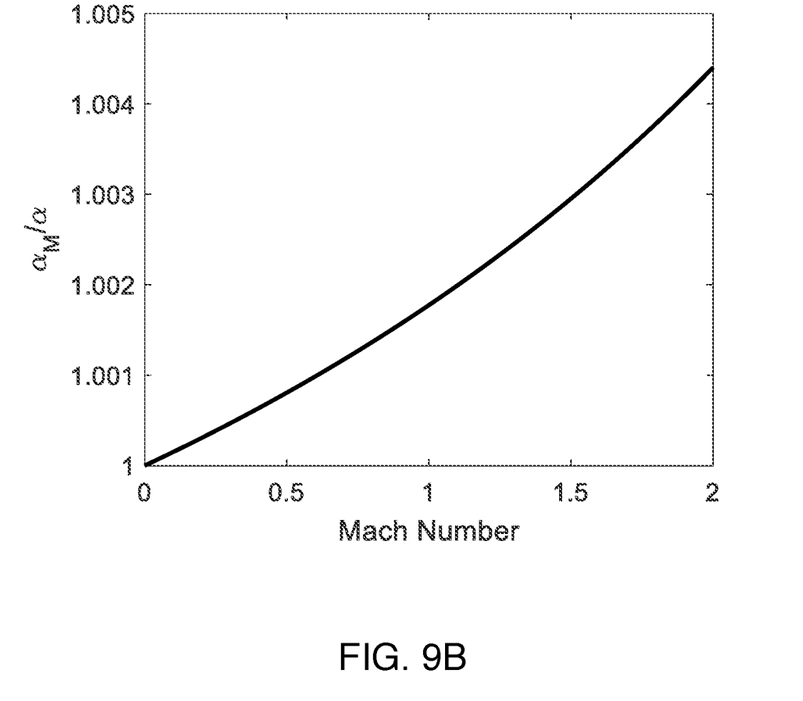
FIG. 9B shows change in the leak rate as a function of Mach number in water for a flow in the direction of the propagating guided waves.

FIG. 9B shows change in the leak rate as a function of Mach number in water for a flow in the direction of the propagating guided waves.

Figure 10:
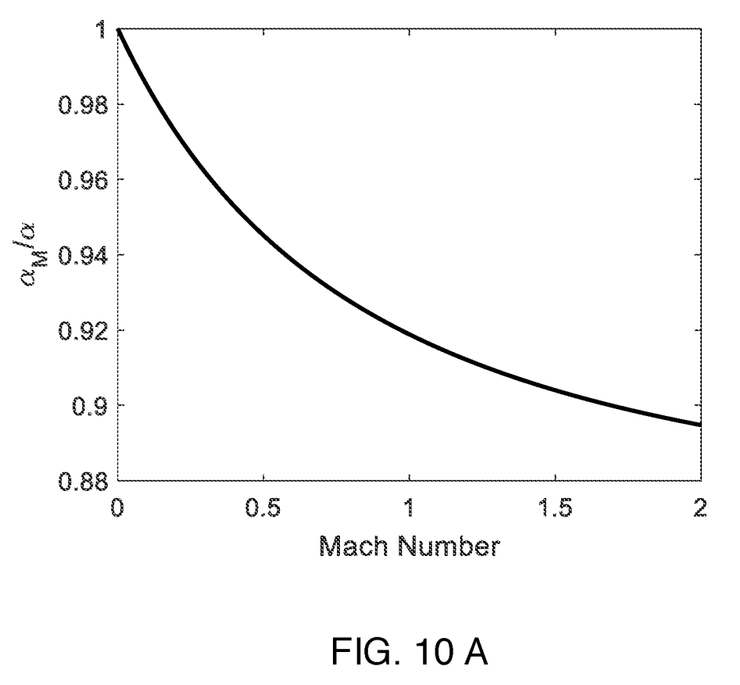
FIGS. 10A-B show change in the leak rate as a function of Mach number in air and water for a flow in the opposite direction of the propagating guided waves.

FIGS. 10A-B shows change in the leak rate as a function of Mach number in air (FIG. 10A) and water (FIG. 10B) for a flow in the opposite direction of the propagating guided waves. Evidently, the leak rate is very much influenced by the type of the moving fluid and its direction and rate of flow.

Figure 11:
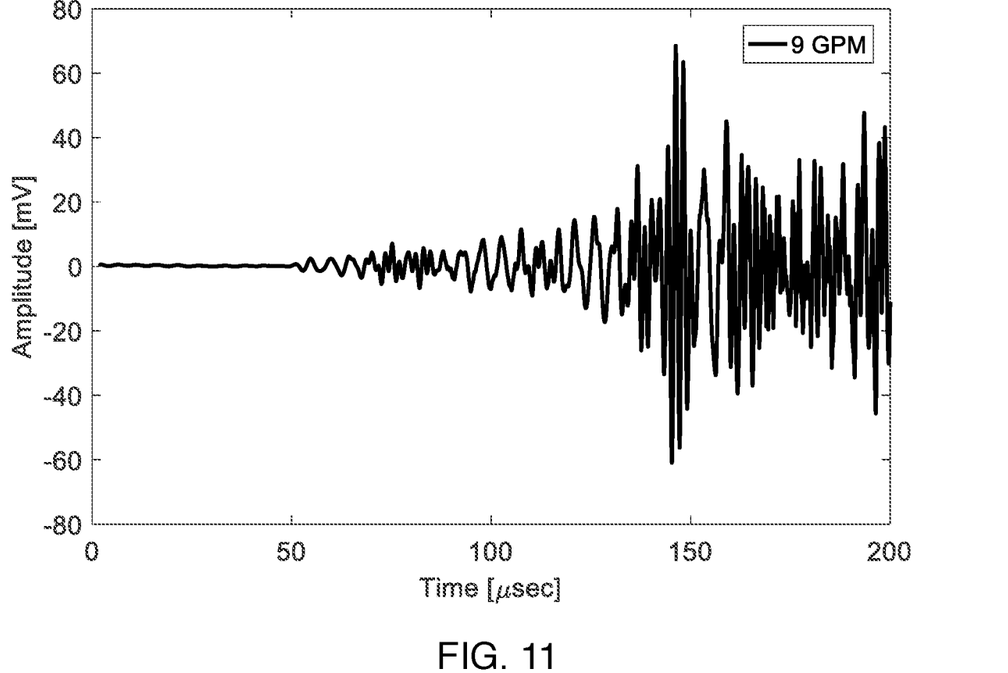
FIG. 11 shows an acoustic difference waveform for 10 gallons per minute water flow vs. static water.

FIG. 11 shows a water flow measurement using the leaky Lamb wave technique. The amplitudes of the received leaky Lamb waves were measured as a function of flow rate. They were monitored and recorded using a function generator and oscilloscope. The plot shows the difference waveform of a 10 GPM (gallons per minute) flow and static water. The difference amplitude emanates from the leaked wave energy.

The invention claimed is:

1. A method for measuring fluid flow rate in a pipe, the method comprising:
providing a pipe having a single-phase fluid flow within it;
disposing at least two axially separated acoustic transducers on an outside surface of the pipe;
exciting one or more leaky Lamb waves in a wall of the pipe with one or more of the acoustic transducers, wherein each leaky Lamb wave has a corresponding leak rate of energy loss to the single-phase fluid flow, wherein the leak rates of the Lamb waves depend on flow parameters of the fluid within the pipe;
receiving the one or more leaky Lamb waves with one or more of the acoustic transducers to provide received acoustic signals;
wherein a propagation path of the one or more leaky Lamb waves from excitation to reception is only in the wall of the pipe;
measuring the leak rates of the leaky Lamb waves from the received acoustic signals; and
determining at least a fluid flow rate in the pipe by collective analysis of the measured leak rates;
further comprising performing phase change measurements of the leaky Lamb waves, and wherein the collective analysis includes determining flow rate from both the measured leak rates and the phase change measurements.

2. The method of claim 1, wherein the fluid flow is a gas flow.

3. The method of claim 1, wherein the fluid flow is a liquid flow.

4. The method of claim 1, wherein the at least two axially separated acoustic transducers are selected from the group consisting of: piezoelectric transducers, electromagnetic acoustic transducers, capacitive micromachined ultrasonic transducers, and piezoelectric micromachined ultrasonic transducers.

5. The method of claim 1, wherein the one or more leaky Lamb waves are two or more leaky Lamb waves that have different penetration depths into the single-phase fluid flow, whereby a fluid flow rate profile vs. radius can be determined.

6. The method of claim 1, wherein the collective analysis is performed using machine learning that has been trained on a set of reference data.

7. The method of claim 1, wherein the collective analysis is performed analytically or with a computer implemented numerical model.

8. The method of claim 1, wherein a selected two or more of the axially separated acoustic transducers operate as both transmitters and receivers during data collection, whereby bi-directional leak rate data is provided.

9. The method of claim 8, wherein the selected two or more of the axially separated acoustic transducers operate as both transmitters and receivers simultaneously, whereby standing waves are generated in a wall of the pipe between the selected two or more of the axially separated acoustic transducers.

10. The method of claim 1, further comprising determining one or more fluid parameters selected from the group consisting of: pressure, temperature, composition, and bubble content.

* * * * *